(12) United States Patent
Lee et al.

(10) Patent No.: US 10,142,551 B2
(45) Date of Patent: Nov. 27, 2018

(54) METHOD AND APPARATUS FOR RECOGNIZING INFORMATION IN AN IMAGE

(71) Applicant: HANWHA TECHWIN CO., LTD., Changwon-si (KR)

(72) Inventors: Jaehoon Lee, Changwon-si (KR); Hongwoo Kim, Changwon-si (KR); Joonggyun Jung, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 176 days.

(21) Appl. No.: 14/561,763

(22) Filed: Dec. 5, 2014

(65) Prior Publication Data

US 2015/0163390 A1 Jun. 11, 2015

(30) Foreign Application Priority Data

Dec. 10, 2013 (KR) .......................... 10-2013-0153312

(51) Int. Cl.
*H04N 5/235* (2006.01)
*H04N 5/225* (2006.01)
*G06K 9/32* (2006.01)
*G06K 9/20* (2006.01)
*H04N 7/18* (2006.01)
*G08G 1/017* (2006.01)
(Continued)

(52) U.S. Cl.
CPC .......... *H04N 5/2352* (2013.01); *G06K 9/2027* (2013.01); *G06K 9/3258* (2013.01); *G08G 1/0175* (2013.01); *G08G 1/054* (2013.01); *H04N 5/2256* (2013.01); *H04N 5/2258* (2013.01); *H04N 7/188* (2013.01); *G06K 9/00771* (2013.01); *G06K 9/00785* (2013.01); *G06K 2209/15* (2013.01)

(58) Field of Classification Search
CPC .... H04N 5/2352; H04N 5/2256; H04N 7/183; G06K 9/00771; G06K 9/3258
See application file for complete search history.

(56) References Cited

U.S. PATENT DOCUMENTS 2,956,117 A * 10/1960 Ernst ....................... B61L 25/04 246/124
5,809,161 A * 9/1998 Auty ........................ G01P 3/38 340/937

(Continued)

FOREIGN PATENT DOCUMENTS

| JP | 10-261190 A | 9/1998 |
| KR | 10-2009-0067230 A | 6/2009 |
| KR | 10-2012-0019702 A | 8/2012 |

*Primary Examiner* — Tung T Vo
(74) *Attorney, Agent, or Firm* — Sughrue Mion, PLLC (57) ABSTRACT

A method and apparatus for recognizing information included in an image, e.g., a license plate number of a vehicle image. The method includes: detecting an ambient illuminance and determining a speed of a moving object; capturing, by an image capturer, image frames of the moving object according to at least one of a shutter opening time of the image capturer and an illuminance of an illuminator to illuminate the moving object which are set based on the detected ambient illuminance and the determined speed of the moving object; and extracting information of the moving object from the captured image frames.

8 Claims, 10 Drawing Sheets

(51) Int. Cl.
   *G08G 1/054*    (2006.01)
   *G06K 9/00*     (2006.01)

(56) References Cited

U.S. PATENT DOCUMENTS

| | | | |
|---|---|---|---|
| 5,935,190 A * | 8/1999 | Davis | G01S 13/62 |
| | | | 340/936 |
| 2002/0060640 A1* | 5/2002 | Davis | G01S 13/583 |
| | | | 342/104 |
| 2003/0174865 A1* | 9/2003 | Vernon | G06K 9/2018 |
| | | | 382/105 |
| 2006/0132604 A1* | 6/2006 | Lao | G08B 13/19647 |
| | | | 348/148 |
| 2007/0046448 A1* | 3/2007 | Smitherman | G01C 11/02 |
| | | | 340/431 |
| 2009/0161913 A1 | 6/2009 | Son | |
| 2012/0002045 A1* | 1/2012 | Tony | G06K 9/209 |
| | | | 348/143 |

* cited by examiner

METHOD AND APPARATUS FOR RECOGNIZING INFORMATION IN AN IMAGE

CROSS-REFERENCE TO THE RELATED APPLICATION

This application claims priority from Korean Patent Application No. 10-2013-0153312, filed on Dec. 10, 2013, in the Korean Intellectual Property Office, the disclosure of which is incorporated herein in its entirety by reference.

BACKGROUND

1. Field

Methods and apparatuses consistent with exemplary embodiments relate to recognizing an image, and more particularly, to recognizing information included in an image of a moving object, such as a license number plate or number plate, of a vehicle after detecting entry of the moving object in a predetermined area.

2. Description of the Related Art

An apparatus for recognizing a number plate of a vehicle used in searching for a vehicle, that is subject to investigation or controlling overspending of a vehicle, recognizes numbers marked in the number plate of a vehicle after entry of the vehicle is detected. A camera for recognizing a number plate includes an illuminator such as an infrared light-emitting device for night photography.

A highest illuminance is to be applied to the illuminator in order for the camera for recognizing a number plate to capture image frames of the vehicle that has entered at night. Thus, due to heat generation of the illuminator for night photography, the illuminator may often get out of order, a lifetime of the illuminator may be shortened, and power consumption of the illuminator for night photography is increased.

SUMMARY

Exemplary embodiments of the inventive concept provide methods and apparatuses for recognizing information included in an image, e.g., a number plate of a vehicle, in which a highest illuminance is not needed to be applied to an illuminator for night photography.

Various aspects of the exemplary embodiments will be set forth in part in the description which follows and, in part, will be apparent from the description, or may be learned by practice of the presented embodiments.

According to an exemplary embodiment, there is provided a method of recognizing information included in an image which may include: detecting an ambient illuminance and determining a speed of a moving object; capturing, by an image capturer, image frames of the moving object according to at least one of a shutter opening time of the image capturer and an illuminance of an illuminator to illuminate the moving object which are set based on the detected ambient illuminance and the determined speed of the moving object; and extracting information of the moving object from the captured image frames.

The method may further include outputting a trigger signal, controlling the image capturer to capture the image frames of the moving object, if the detected ambient illuminance is lower than a reference illuminance.

Here, the shutter opening time may be set to be inversely proportional to the determined speed of the moving object, and the illuminance of the illuminator may be set to be inversely proportional to the shutter opening time.

The capturing the image frames may be performed according to both the shutter opening time of the image capturer and the illuminance of the illuminator.

The method may further include: capturing, by another image capturer, a plurality of image frames per unit time based on the detected ambient illuminance when the moving object enters a predetermined area monitored by the other image capturer; determining the speed of the moving object based on the plurality of image frames captured per unit time; and outputting a trigger signal by the other image capturer to control the image capturer to capture the image frames of the moving object, based on the determined speed of the moving object.

The determining the speed of the moving object may be performed by counting a number of image frames which includes the moving object from among the plurality of image frames captured per unit time by the other image capturer.

While the illuminator may include a plurality of light-emitting components, the method may further include: determining a position of the moving object; and capturing the image frames of the moving object by turning on only light-emitting components, corresponding to the determined position of the moving object, from among the plurality of light-emitting components.

Whether the moving object has entered the predetermined area may be detected by using a sensor such as an infrared (IR) sensor, a laser sensor, and a loop coil.

The number of image frames, which include the moving object, captured by the other image capturer may be inversely proportional to the speed of the moving object.

The method may further include: if the detected ambient illuminance is higher than a reference illuminance, capturing, by the other image capturer, the image frames of the moving object; and extracting the information of the moving object from the image frames captured by the other image capturer without performing the capturing the plurality of image frames per unit time, the determining the speed of the moving object and the outputting the trigger signal.

According to another exemplary embodiment, there is provided an apparatus for recognizing information included in an image which may include: an image capturer configured to capture image frames of a moving object according to at least one of a shutter opening time of the image capturer and an illuminance of an illuminator to illuminate the moving object which are set based on an ambient illuminance and a speed of the moving object; and a controller configured to extract information of the moving object from the captured image frames.

The shutter opening time may be set to be inversely proportional to the speed of the moving object, and the illuminance of the illuminator may be set to be inversely proportional to the shutter opening time.

The image capturer may be configured to capture the image frames of the moving object, if it is determined that the ambient illuminance is lower than a reference illuminance.

The image capturer may be configured to capture the image frames of the moving object according to both the shutter opening time of the image capturer and the illuminance of the illuminator.

The apparatus may include another image capturer configured to capture a plurality of image frames per unit time based on the detected ambient illuminance when the moving object enters a predetermined area monitored by the other image capturer, the plurality of image frames captured per unit time being used to determine the speed of the moving object.

The other image capturer may be further configured to output a trigger signal to control the image capturer to capture the image frames of the moving object, based on the determined speed of the moving object.

The speed of the moving object may be determined by the other image capturer or the controller by counting a number of image frames which includes the moving object from among the plurality of image frames captured per unit time by the other image capturer.

The apparatus may further include a detector for detecting whether the moving object has entered the predetermined area by using a sensor.

If the detected ambient illuminance is determined to be higher than a reference illuminance, the other image capturer may be configured to capture the image frames of the moving object, and extract the information of the moving object from the image frames captured by the other image capturer without having the image capturer perform the capturing the plurality of image frames per unit time and output the trigger signal.

The apparatus may further include the illuminator which includes a plurality of light-emitting components. The other image capturer may be further configured to determine a position of the moving object, and the image capturer may be further configured to capture the image frames of the moving object according to the controller turning on only light-emitting components, corresponding to the determined position of the moving object, from among the plurality of light-emitting components.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE EXEMPLARY EMBODIMENTS

Reference will now be made in detail to exemplary embodiments which are illustrated in the accompanying drawings, wherein like reference numerals refer to like elements throughout. In this regard, these embodiments may have different forms and should not be construed as being limited to the descriptions set forth herein. Accordingly, the exemplary embodiments are merely described below, by referring to the figures, to explain various aspects of the inventive concept. As used herein, the term "and/or" includes any and all combinations of one or more of the associated listed items. Expressions such as "at least one of," when preceding a list of elements, modify the entire list of elements and do not modify the individual elements of the list.

The following description exemplifies only the principles of the inventive concept. Even if they are not described or illustrated clearly in the present specification, those of ordinary skill in the art can embody the principles of the inventive concept and invent various apparatuses within the inventive concept and scope of the inventive concept. The use of the conditional terms and exemplary embodiments presented in the present specification are intended only to make the inventive concept understood, and they are not limited to these embodiments and conditions mentioned in the specification. In addition, all the detailed description on the principles, viewpoints and exemplary embodiments and particular embodiments of the inventive concept should be understood to include structural and functional equivalents thereto. The equivalents include not only currently known equivalents but also those to be developed in the future, that is, all devices invented to perform the same function, regardless of their structures.

Therefore, functions of various devices illustrated in the drawings including a functional block expressed as a processor or a similar concept can be provided not only by using hardware dedicated to the functions, but also by using hardware capable of running proper software for the functions. The functional block may be also implemented by software and/or firmware structures that execute respective functions. When a function is provided by a processor, the function may be provided by a single dedicated processor, single shared processor, or a plurality of individual processors, part of which can be shared. The apparent use of a term, 'processor', 'control' or similar concept, should not be understood to exclusively refer to a piece of hardware capable of running software, but should be understood to include a digital signal processor (DSP), hardware, and read-only memory (ROM), random access memory (RAM) and non-volatile memory for storing software, implicatively. Other known and commonly used hardware may be included therein, too.

The description below and the attached drawings are provided to gain understanding of operations according to the inventive concept. Description of elements or operations which may be easily implemented by one of ordinary skill in the art may be omitted.

The description and the drawings are not provided for limitation, and the inventive concept should be defined by the appended claims. The meaning of the terms used in the present specification and claims of the inventive concept should be construed as meanings and concepts not departing from the spirit and scope of the inventive concept based on the principle that the inventor is capable of defining concepts of terms in order to describe his or her invention in the most appropriate way.

Figure 1:
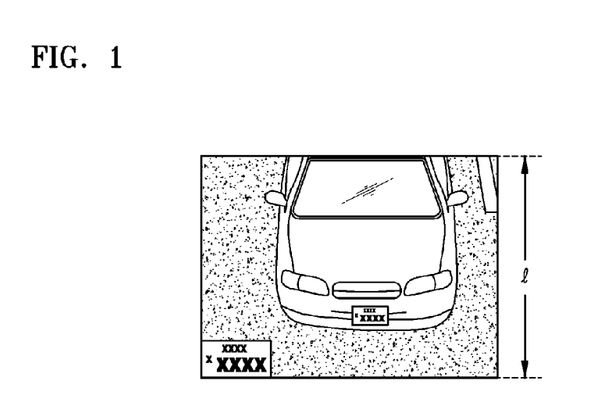
FIG. 1 is a diagram for explaining an image frame captured by using a number plate recognizing apparatus, according to an exemplary embodiment.

FIG. 1 is a diagram for explaining an image frame captured by using a number plate recognizing apparatus, according to an exemplary embodiment. In FIG. 1, a vertical length l of an image frame corresponds to a vehicle entering distance in a photographing area of a camera for recognizing a number plate. For example, for accurate recognition of a number plate, a vehicle entering distance in a photographing area of the camera for recognizing a number plate may be set to about 5 meters (m).

The camera for recognizing a number plate captures a plurality of image frames per a unit time. For example, the camera for recognizing a number plate may capture 30 image frames per second. However, a vehicle that is overspeeding and enters with a speed of 180 km/h covers about 5 meters which is a vehicle entering distance in only about 0.1 second. Thus, if an overspeeding vehicle enters, the camera for recognizing a number plate may capture just two or three image frames per second.

When recognizing a number plate of an overspeeding vehicle, if a shutter opening time (also referred to as a shutter speed) of the camera for recognizing a number plate is long, it may be difficult for the camera to recognize a number plate as an image of the vehicle is blurred. The camera for recognizing a number plate may apply a short shutter opening time in order to capture image frames of a vehicle that enters at night. Here, in order to compensate for darkness due to the short shutter opening time, the camera for recognizing a number plate may apply a high illuminance to an illuminator.

Figure 2:
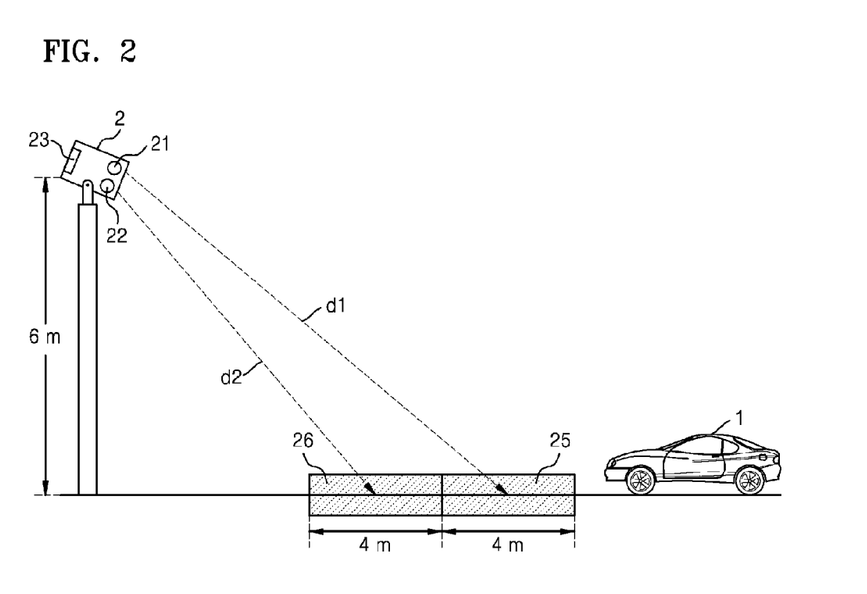
FIGS. 2 and 3 are diagrams for explaining a method and apparatus for recognizing a number plate, according to an exemplary embodiment.
Figure 3:
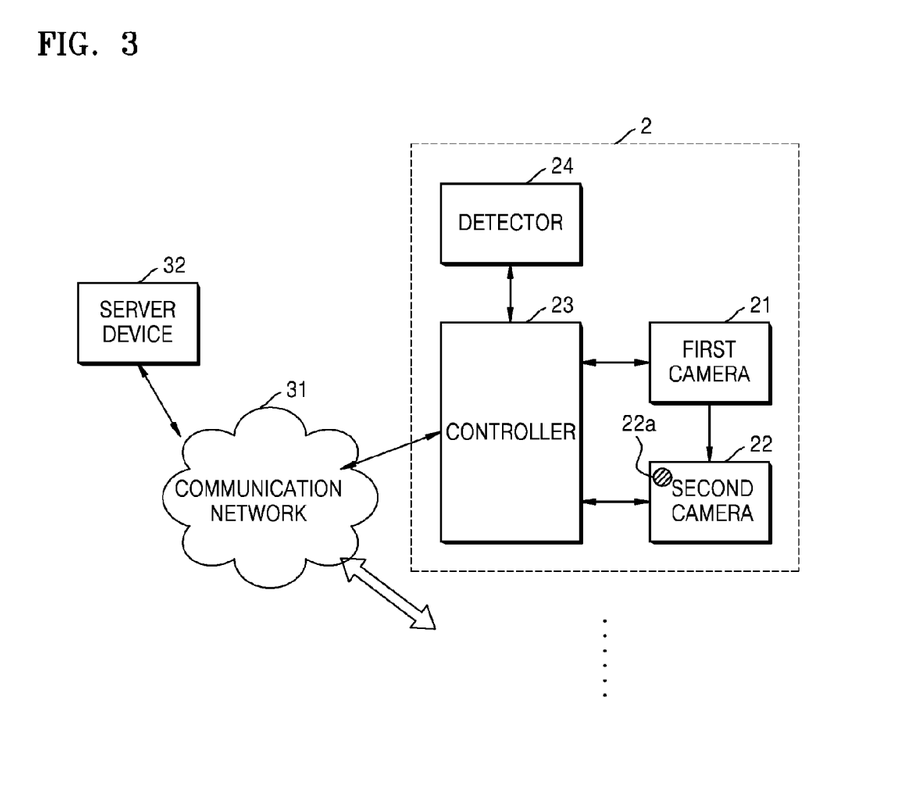

FIGS. 2 and 3 are diagrams for explaining a method and apparatus for recognizing a number plate, according to an exemplary embodiment.

Referring to FIGS. 2 and 3, the method of recognizing a number plate includes following three operations, according to an exemplary embodiment.

In a first operation, in an environment where an ambient illuminance is lower than a first reference illuminance, a first camera 21 outputs a trigger signal according to a speed of an entering vehicle 1. The first reference illuminance refers to a reference whereby an environment in which illuminance is low (hereinafter referred to as a low-illuminance environment) is selected. The low-illuminance environment may be, for example, at night, bad weather, or dark place.

In a second operation, a second camera 22 captures image frames of the entering vehicle 1, to which a shutter opening time and illuminance of an illuminator 22a corresponding to the trigger signal are applied.

In a third operation, the controller 23 extracts an area of a number plate from the image frames and reads number plate information from the extracted area of the number plate.

The shutter opening time of the second camera 22 is inversely proportional to an entering speed of the entering vehicle 1, and the illuminance of the illuminator 22a is inversely proportional to the shutter opening time.

An apparatus 2 for recognizing a number plate according to an exemplary embodiment is an apparatus that recognizes a number plate of the entering vehicle 1 after detecting entry of the same, and includes the first camera 21, the second camera 22, the controller 23, and a detector 24.

In FIG. 3, the controller 23 and the detector 24 are illustrated as independent components of the apparatus 2 with respect to the first camera 21 and the second camera 22. However, according to an exemplary embodiment, at least one of the controller 23 and the detector 24 may be included in one of the first camera 21 and the second camera 22. The controller 23 may be implemented by hardware, software and/or firmware structures that execute respective functions including functions described herein, according to exemplary embodiments.

Further, although the apparatus 2 is illustrated has including two different cameras 21 and 22, these two cameras and their functions described herein may be integrated into one single camera having two image capturing devices, according to an exemplary embodiment. For convenience of explaining the inventive concept, the apparatus 2 is described herein as having two different cameras 21 and 22.

The first camera 21 and the second camera 22 are image capturing apparatuses that are fixed in a monitoring area such as a road or a parking lot and perform a function of obtaining information of vehicles that enter detecting areas 25 and 26. The detecting area 25 may be an area to be photographed by using the first camera 21 and the detecting area 26 may be an area to be photographed by using the second camera 22. Vehicle information may include information indicating that a vehicle is entering, a vehicle number plate, the number of vehicles, a speed of a vehicle, etc. The first camera 21 and the second camera 22 have predetermined angles of view and predetermined resolutions. An angle of view may be determined based on a distance between a camera and an area to be photographed by using the camera. The first camera 21 and the second camera 22 are connected to the controller 23 in a wireless or wired manner. As illustrated in FIG. 2, the first camera 21 and the second camera 22 are fixed to a pole and continuously capture images of the detecting areas 25 and 26 to detect vehicles that pass a road and obtain images of the vehicles, images of number plates of the vehicles, the number of the vehicles, and speeds of vehicles.

The first camera 21 captures an image and outputs a trigger signal. For example, the first camera 21 may capture an image and output a trigger signal according to a control signal received from the controller 23.

When a vehicle enters the detecting area 25, a movement detecting event is generated and the first camera 21 captures an image of the entering vehicle, accordingly. The first camera 21 may have a function of a visible light camera that captures a visible light image. The first camera 21 captures a visible light image in an environment in which an ambient illuminance is higher than a first reference illuminance, for example, in a general illuminance environment with an illuminance higher than a low-illuminance environment, according to a first signal received by the controller 23.

The first camera 21 outputs a trigger signal based on a vehicle entering speed according to a second signal received by the controller 23 in an environment like a low-illuminance environment where an ambient illuminance is lower than the first reference illuminance.

The first camera 21 may estimate a speed of a vehicle based on the number of obtained image frames. The first camera 21 may transmit captured images to the controller 23 and receive vehicle speed information based on image analysis received from the controller 23.

According to another exemplary embodiment, the first camera 21 may capture a visible light image in an environment where an ambient illuminance detected by using an illuminance sensor (not shown) is higher than the first reference illuminance, and may output a trigger signal in an environment where an ambient illuminance detected by using the illuminance sensor is lower than the first reference illuminance, but is not limited thereto.

The second camera 22 may have a function of an infrared (IR) camera that captures an IR image, and include an illuminator 22a. The illuminator 22a includes at least one IR emitting diode (IRED) that performs front illumination. Upon receiving a trigger signal from the first camera 21, the second camera 22 captures image frames of the entering vehicle 1, to which a shutter opening time and illuminance of the illuminator 22a corresponding to the trigger signal are applied.

An initial illuminance of the illuminator 22a may be previously determined based on at least one of an ambient illuminance and lane information.

The initial illuminance may be determined to correspond to an ambient illuminance. For example, an illuminance sensor (not shown) such as a phototransistor included in the second camera 22 may sense an ambient illuminance. If the ambient illuminance is lower than a second reference illuminance, maximum illuminance may be determined as the initial illuminance, and if the ambient illuminance is higher than the second reference illuminance, illuminance that is lower than maximum illuminance may be determined as the initial illuminance. The second reference illuminance may be lower than the first reference illuminance. For example, an ambient illuminance that is lower than the second reference illuminance may refer to an ambient illuminance of an environment where no light such as streetlamp light exists at all around the apparatus 2 for recognizing a number plate when performing night photography.

The initial illuminance may be determined based on lane information of the detecting area 26 to be photographed. For example, a global positioning system (GPS) module (not shown) included in the second camera 22 may receive GPS information from a communication network 31 or the like. If an obstacle such as an accident, a vehicle that is out of order, maintenance work or the like occurs in the detecting area 26 from the GPS information, the second camera 22 may set a long shutter opening time and the lowest illuminance as an initial illuminance of the illuminator 22a.

When the trigger signal is output from the first camera 21, illuminance of the illuminator 22a may be changed from the initial illuminance to illuminance corresponding to the trigger signal.

The controller 23 may extract a number plate area from image frames received from the second camera 22, and reads number plate information from the extracted number plate area. The read number plate information is transmitted to a server device 32, for example, to a service device of a police agency, through the communication network 31.

Here, a first distance d1 between the first camera 21 and the detecting area 25 to be photographed by the first camera 21 is set to be longer than a second distance d2 between the second camera 22 and the detecting area 26 to be photographed by the second camera 22.

The detector 24 detects whether a vehicle enters the detecting area 25 of the first camera 21. The detector 24 may include, in addition to the first camera 21, a sensor such as a laser sensor, a loop coil, etc. The first camera 21 may detect whether a vehicle has entered, by using an image detection method. A laser sensor may detect whether a vehicle has entered, by using a non-burying and non-contact method. A loop coil may detect whether a vehicle has entered by using a burying and contact method.

According to the method and the apparatus 2 for recognizing a number plate according to the present embodiment, in a low-illuminance environment such as at night, bad weather and dark place, vehicle images may be obtained by using at least two cameras having different views of angle and different resolutions, and thus accurate vehicle information may be obtained. In an environment with a lower ambient illuminance than the first reference illuminance, the first camera 21 outputs a trigger signal based on a vehicle entering speed, and the second camera 22 captures image frames of the entering vehicle 1 by applying a shutter opening time and illuminance of the illuminator 22a corresponding to the trigger signal.

That is, as a shutter opening time that is inversely proportional to a vehicle entering speed is applied, even though illuminance of the illuminator 22a that is proportional to the vehicle entering speed is applied, an image of the entering vehicle 1 is not blurred. For example, when a high-speed vehicle enters, the first camera 21 may output a trigger signal according to entering of the high-speed vehicle, and the second camera 22 may capture an image frame of the entering vehicle 1 by applying a short shutter opening time and a high illuminance of the illuminator 22a so as to correspond to the trigger signal. When a low-speed vehicle enters, the first camera 21 may output a trigger signal according to entering of the low-speed vehicle, and the second camera 22 may capture an image frame of the entering vehicle 1 by applying a long shutter opening time and low illuminance of the illuminator 22a so as to correspond to the trigger signal.

Thus, as the problem that a highest illuminance always has to be applied to the illuminance unit 22a for night photography may be addressed, following effects may be obtained.

First, all of problems such as frequent failures of the illuminator 22a and a reduced lifetime thereof due to heat generation of the illuminator 22a in night photography may be addressed.

Secondly, power consumption of the illuminator 22a in night photography may be reduced.

Figure 4:
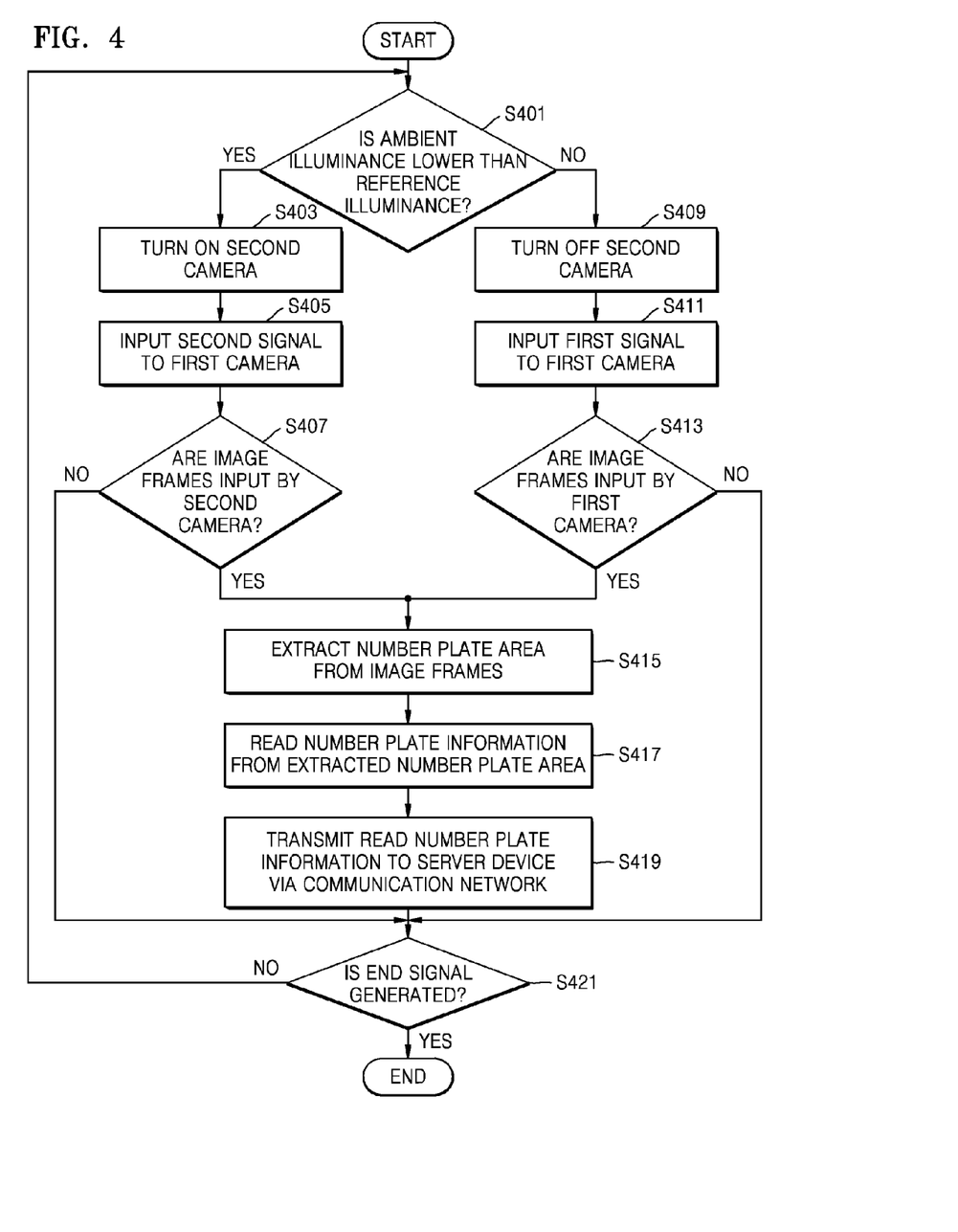
FIG. 4 is a flowchart of an operation of a controller of FIGS. 2 and 3, according to an exemplary embodiment.

FIG. 4 is a flowchart of an operation of the controller 23 of FIGS. 2 and 3. The operation of the controller 23 is described below with reference to FIGS. 2 through 4.

First, the controller 23 determines whether an ambient illuminance is lower than the first reference illuminance, in operation S401. Although not illustrated, the apparatus 2 for recognizing a number plate may include an illuminance sensor which senses illuminance of a photographing area and a change in the illuminance. The controller 23 may recognize an ambient illuminance based on an illuminance sensing signal and compare the ambient illuminance with the first reference illuminance.

In an environment in which an ambient illuminance is not lower than the first reference illuminance, for example, in the day time, the controller 23 may turn off the second camera 22 in operation S409, and inputs a first signal to the first camera 21 in operation S411.

Next, when image frames are input by the first camera 21 in operation S413, the controller 23 extracts a number plate area from the image frames in operation S415. The controller 23 reads number plate information from the extracted number plate area in operation S417.

Next, the controller 23 transmits the read number plate information to the server device 32 through the communication network 31 in operation S419.

Meanwhile, in an environment in which an ambient illuminance is lower than the first reference illuminance, for exampling, by night, the controller 23 turns on the second camera 22 in operation S403, and inputs a second signal to the first camera 21 in operation S405.

Next, when image frames are input by the second camera 22 in operation S413, the controller 23 extracts a number plate area from the image frames in operation S415. The controller 23 reads number plate information from the extracted number plate area in operation S417.

Next, the controller 23 transmits the read number plate information to the server device 32 through the communication network 31 in operation S419.

All of the above operations are repeatedly performed until an end signal is generated in operation S421.

Figure 5:
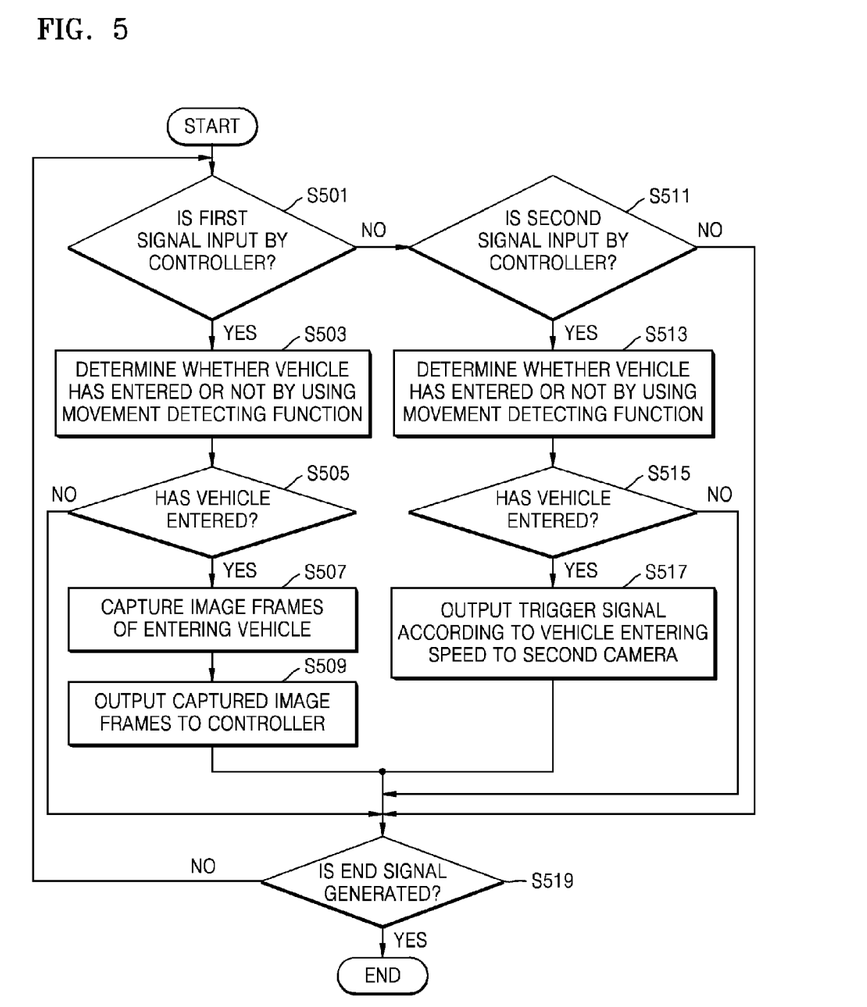
FIG. 5 is a flowchart of an operation of a first camera of FIGS. 2 and 3 corresponding to the operation of the controller of FIG. 4, according to an exemplary embodiment.

FIG. 5 is a flowchart of an operation of the first camera 21 of FIGS. 2 and 3 corresponding to the operation of the controller 23 of FIG. 4. Hereinafter, the operation of the first camera 21 corresponding to the operation of the controller 23 of FIG. 4 will be described with reference to FIGS. 2, 3, and 5.

When a first signal is input by the controller 23 in operation S501, the first camera 21 determines whether a vehicle has entered by using a movement detecting function in operation S503. Although not illustrated in the drawings, whether a vehicle has entered may be detected by using a sensor such as laser sensor, a loop coil, etc.

When it is determined that a vehicle has entered in operation S505, the first camera 21 captures image frames of an entering vehicle in operation S507. Then the first camera 21 transmits the captured image frames to the controller 23 in operation S509.

Meanwhile, when a second signal is input by the controller 23 in operation S511, the first camera 21 determines whether a vehicle has entered by using a movement detecting function in operation S513. Although not illustrated in the drawings, whether a vehicle has entered may be detected by using a sensor such as a laser sensor, a loop coil, etc.

When a vehicle has entered in operation S515, the first camera 21 outputs a trigger signal based on a vehicle entering speed to the second camera 22 in operation S517. Operation S517 will be described in detail with reference to FIG. 6.

All of the above operations are repeatedly performed until an end signal is generated in operation S519.

Figure 6:
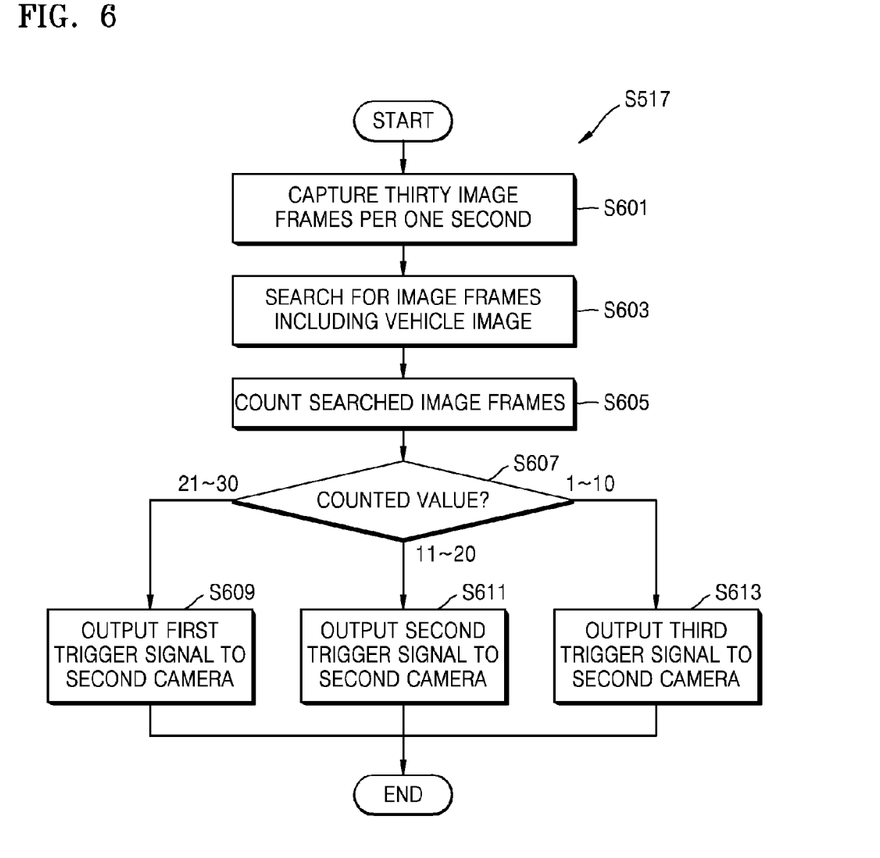
FIG. 6 is a detailed flowchart of operation S517 of FIG. 5, according to an exemplary embodiment.

FIG. 6 is a detailed flowchart of operation S517 of FIG. 5. Next, operation S517 of FIG. 5 will be described in detail with reference to FIGS. 2, 3, and 6.

In a first operation, the first camera 21 determines whether a vehicle has entered by using a movement detecting function, and when the entering vehicle 1 has entered, the first camera 21 captures a plurality of image frames per unit time.

In a second operation, the first camera 21 outputs the trigger signal according to the number of image frames which include a vehicle image, from among captured image frames.

Operation S517 of FIG. 5 will be described below in more detail with reference to FIGS. 2, 3, and 6.

First, the first camera 21 captures a plurality of image frames per unit time, in operation S601. For example, the first camera 21 captures thirty image frames per second.

Next, the first camera 21 searches for image frames in which a vehicle image is included, from among the captured image frames, in operation S603.

Next, the first camera 21 counts the number of searched image frames, in operation S605.

Next, the first camera 21 outputs a trigger signal based on the counted value in operations S607 through S613. That is, the first camera 21 outputs the trigger signal according to the number of image frames in which a vehicle image is included, from among the captured image frames. The number of image frames in which a vehicle image is included is inversely proportional to a vehicle entering speed. For example, the higher is the vehicle entering speed, the less is the number of image frames in which a vehicle image is included, from among the plurality of image frames captured per unit time.

According to the present embodiment, if 21 to 30 image frames are included in a vehicle image (in the case of a low-speed vehicle), the first camera 21 outputs a first trigger signal to the second camera 22, in operations S607 and S609.

Also, if 11 to 20 image frames are included in a vehicle image (in the case of a middle-speed vehicle), the first camera 21 outputs a second trigger signal to the second camera 22, in operations S607 and S611.

Also, if one to 10 image frames are included in a vehicle image (in the case of a high-speed vehicle), the first camera 21 outputs a second trigger signal to the second camera 22, in operations S607 and S613.

Figure 7:
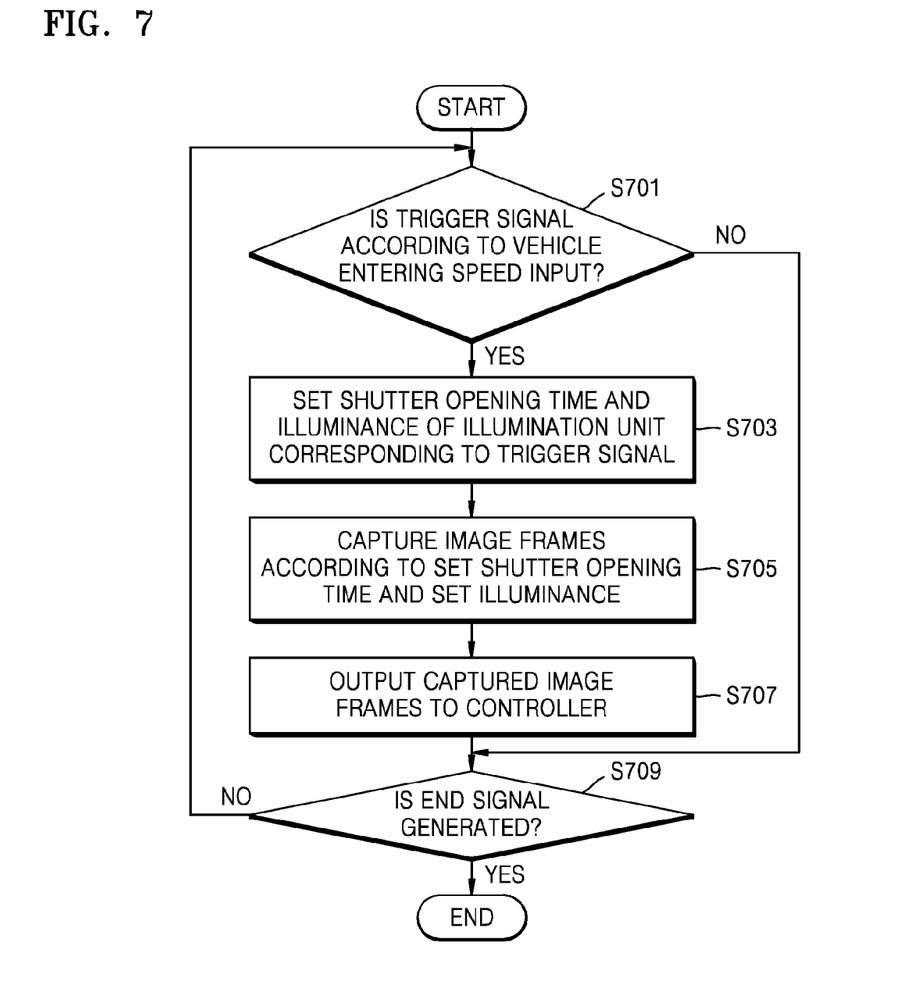
FIG. 7 is a flowchart of an operation of a second camera of FIGS. 2 and 3 corresponding to the operation of FIG. 4, according to an exemplary embodiment.

FIG. 7 is a flowchart of an operation of the second camera 22 of FIGS. 2 and 3 corresponding to the operation of the controller 23 of FIG. 4. Next, the operation of the second camera 22 corresponding to the controller 23 of FIG. 4 will be described with reference to FIGS. 2, 3, and 7.

When a trigger signal according to a vehicle entering speed is output from the first camera 21 and input to the second camera 22 in operation S701, the second camera 22 sets a shutter opening time and illuminance of the illuminator 22a corresponding to the input trigger signal in operation S703.

In operation S703, the shutter opening time is inversely proportional to the vehicle entering speed, and illuminance of the illuminator 22a is inversely proportional to the shutter opening time. (Generally, a shutter opening time is referred to as a shutter speed, and the shutter speed here should be expressed as being proportional to a vehicle entering speed.)

For example, if a first trigger signal is input due to entering of a low-speed vehicle, the second camera 22 sets a long shutter opening time of $1/600$ second, and a low illuminance to the illuminator 22a, accordingly.

Also, if a second trigger signal is input due to entering of a middle-speed vehicle, the second camera 22 sets a middle-length shutter opening time of $1/800$ second, and about a middle illuminance to the illuminator 22a, accordingly.

Also, if a third trigger signal is input due to entering of a high-speed vehicle, the second camera 22 sets a short shutter opening time of $1/1000$ second, and a high illuminance to the illuminator 22a, accordingly.

In operation S705, the second camera 22 captures image frames according to the set shutter opening time and illuminance. For example, the second camera 22 captures thirty image frames per one second.

In operation S707, the second camera 22 outputs the captured image frames to the controller 23. Accordingly, the controller 23 extracts a number plate area from the image frames, and then reads number plate information from the extracted number plate area (refer to operations S415 and S417 of FIG. 4).

All of the above operations are repeatedly performed until an end signal is generated in operation S709.

Figure 8:
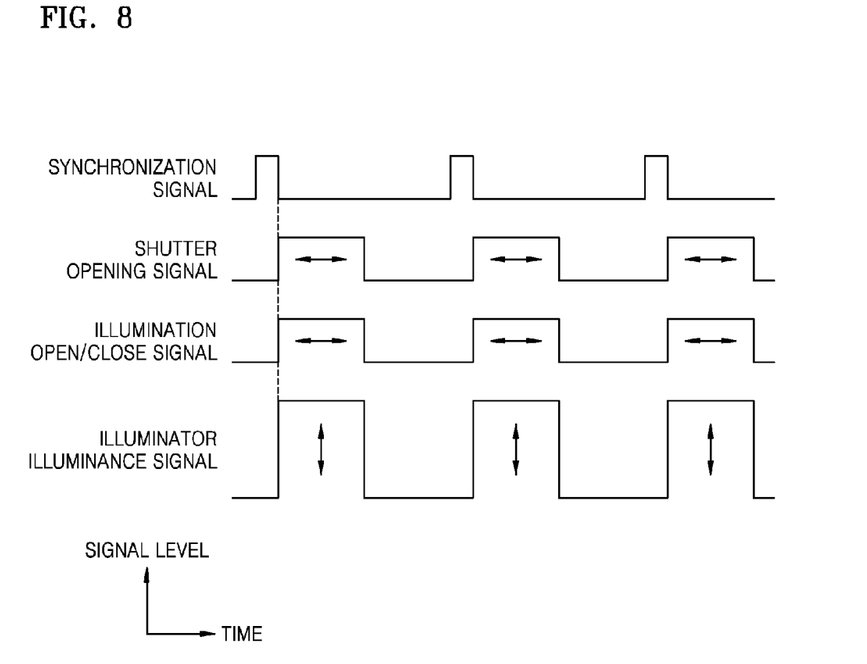
FIG. 8 is a timing diagram for explaining operation S705 of FIG. 7, according to an exemplary embodiment.

FIG. 8 is a timing diagram for explaining operation S705 of FIG. 7.

Referring to FIGS. 2, 3, and 8, a periodic pulse is generated 30 times per second in a trigger signal. A shutter opening signal, an illuminator on/off signal, and an illuminator illuminance signal are generated at a decline point of the periodic pulse. As described above, a shutter opening time is inversely proportional to a vehicle entering speed, and illuminance of the illuminator 22a is inversely proportional to the shutter opening time.

For example, if a first trigger signal is input due to entering of a low-speed vehicle, $1/600$ second which is long is set as a shutter opening time and an illuminator turn-on time, and accordingly, a low illuminance is applied to the illuminator 22a.

Also, if a second trigger signal is input due to entering of a middle-speed vehicle, 1/800 second which is a mid-range is set as a shutter opening time and an illuminator turn-on time, and accordingly, a mid-range illuminance is applied to the illuminator 22a.

Also, if a third trigger signal is input due to entering of a high-speed vehicle, 1/1000 second which is short is set as a shutter opening time and an illuminator turn-on time, and accordingly, a high illuminance is applied to the illuminator 22a.

Figure 9:
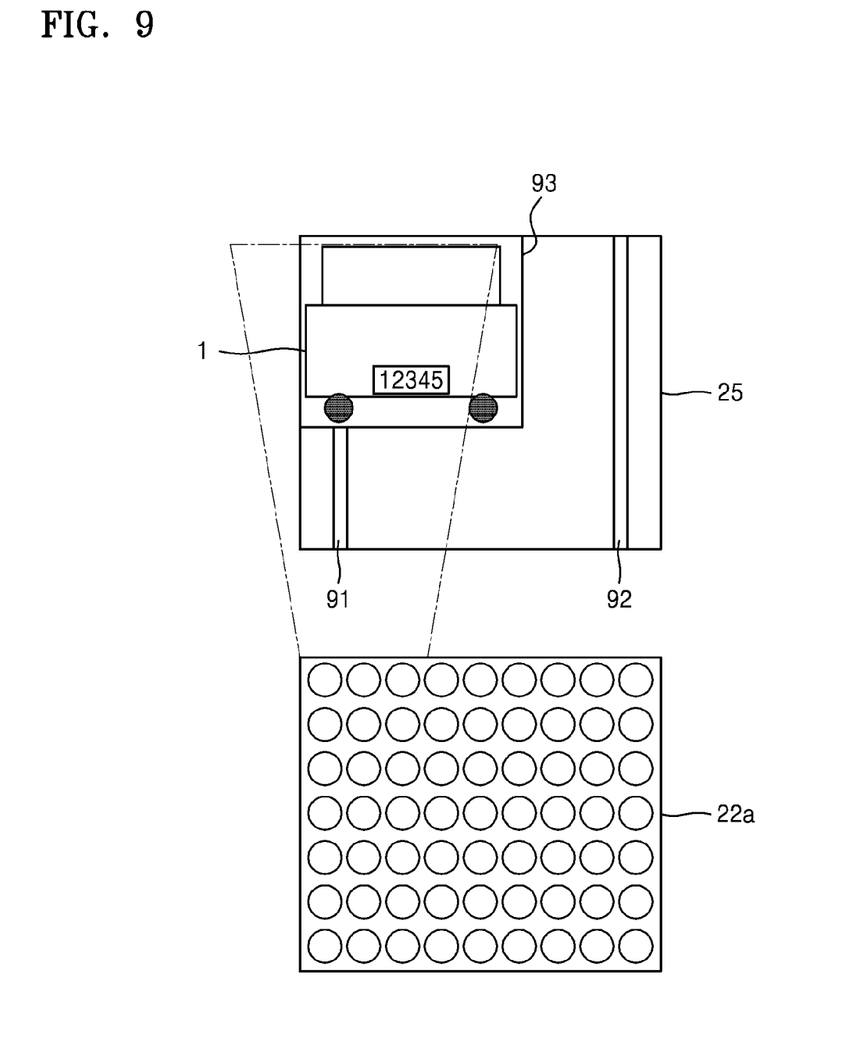
FIGS. 9 through 11 are views illustrating image frames being captured as only light-emitting devices corresponding to a position of an entering vehicle are turned on, in operation S705 of FIG. 7, according to exemplary embodiments.
Figure 10:
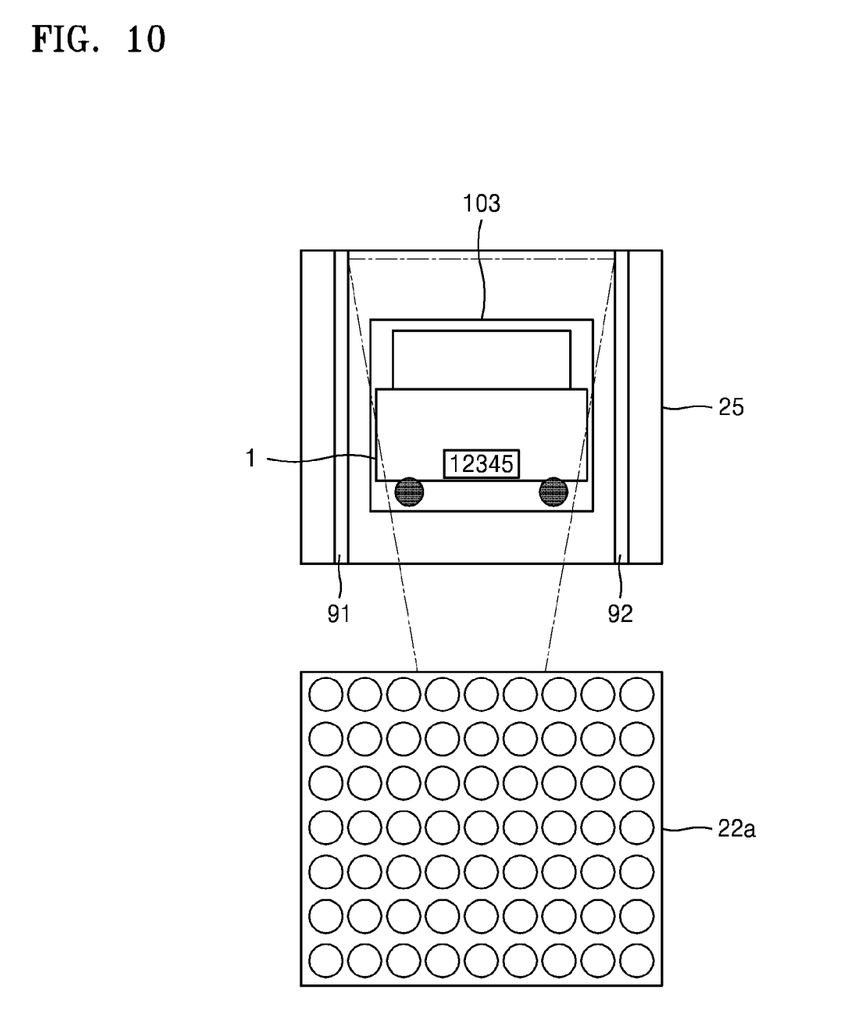
Figure 11:
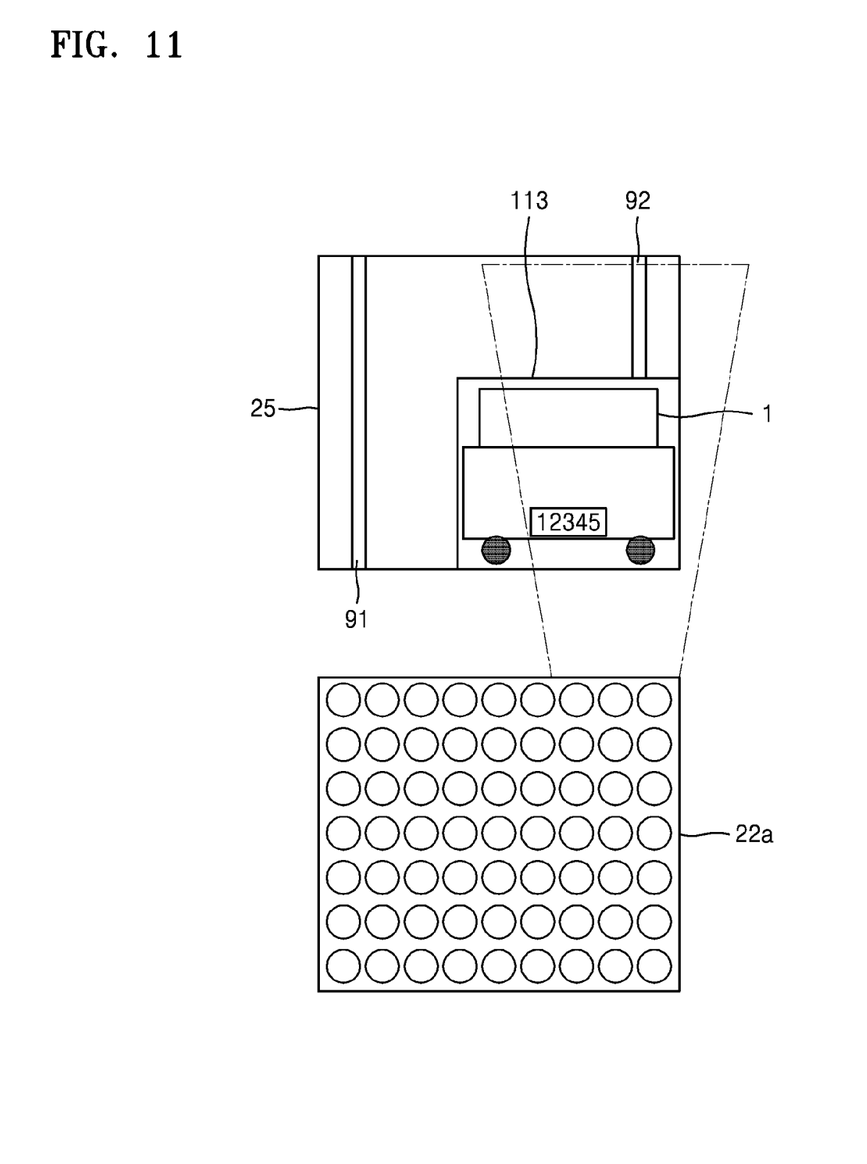

FIGS. 9 through 11 are views illustrating image frames being captured as only light-emitting components corresponding to a position of an entering vehicle are turned on, in operation S705 of FIG. 7. In FIGS. 9 through 11 and FIGS. 2 and 3, like reference numerals denote elements having like functions. Reference numerals 93, 103, and 113 denote areas where movement has occurred.

Referring to FIGS. 2, 3, and 9 through 11, a plurality of light-emitting components, for example, IREDs are included in the illuminator 22a of the second camera 22.

The first camera 21 outputs a vehicle position signal together with the trigger signal (this operation is a different example of operation S517 of FIG. 5).

The vehicle position signal may indicate a position of an entering vehicle that is either on the left or the right with respect to a center of a car lane. For example, the vehicle position signal may indicate that the entering vehicle 1 is located on the left (see FIG. 9), in the center (see FIG. 10), or on the right (see FIG. 11) with respect to a center of a car lane within the detecting area 25 that is to be photographed by using the first camera 21.

The second camera 22 turns on only light-emitting components corresponding to the vehicle position signal, and captures image frames of the entering vehicle 1.

For example, referring to FIG. 9, while turning on only light-emitting components included in a left area of the illuminator 22a, the second camera 22 may capture image frames of the entering vehicle 1 located on the left with respect to a center of a car lane in the detecting area 25 to be photographed by the using first camera 21.

For example, referring to FIG. 10, while turning on only light-emitting components included in a center of the illuminator 22a, the second camera 22 may capture image frames of the entering vehicle 1 located in a center with respect to a center of a car lane in the detecting area 25 to be photographed by using the first camera 21.

For example, referring to FIG. 11, while turning on only light-emitting components included in a right area of the illuminator 22a, the second camera 22 may capture image frames of the entering vehicle 1 located on the right with respect to a center of a car lane in the detecting area 25 to be photographed by using the first camera 21.

Accordingly, heat generation and power consumption of the illuminator 22a may be further improved.

As described above, according to the method and apparatus for recognizing a number plate of the above exemplary embodiments, in night photography in which an ambient illuminance is lower than the first reference illuminance, the first camera outputs a trigger signal according to a vehicle entering speed, and the second camera captures image frames of the entering vehicle by applying a shutter opening time and illuminance of the illuminator corresponding to the trigger signal.

In other words, as a shutter opening time that is inversely proportional to the vehicle entering speed is applied, even when illuminance of the illuminator that is proportional to the vehicle entering speed is applied, images are not blurred.

Thus, the problem that a highest illuminance has to be applied to the illuminator in night photography is addressed, and following effects may be obtained as a consequence.

First, all of problems such as frequent failures and reduced lifetime of the illuminator due to heat generation of the illuminator in night photography may be prevented.

Secondly, power consumption of the illuminator in night photography may be reduced.

Furthermore, when a vehicle has entered, the first camera may capture a plurality of image frames per unit time, and output the trigger signal according to the number of the image frames including a vehicle image from among the captured image frames. That is, inverse proportion of the vehicle entering speed with respect to the number of image frames is used, thereby quickly outputting the trigger signal.

Furthermore, the second camera captures image frames of the entering vehicle while turning on only light-emitting components corresponding to a vehicle position signal from the first camera. Accordingly, heat generation and power consumption of the illuminator may be further improved.

Furthermore, the second camera presets an initial illuminance of the illuminator based on, for example, an ambient illuminance or car lane information. Thus, an abrupt change in a current flowing to the illuminator according to a trigger signal may be prevented, thereby efficiently controlling the illuminator.

The method of recognizing a number plate according to the above exemplary embodiments may be used not only in an apparatus for recognizing a number plate but also in an apparatus for recognizing a moving object.

In addition, other exemplary embodiments can also be implemented through computer readable code/instructions in/on a medium, e.g., a computer readable medium, to control at least one processing element to implement any of the above described embodiments. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A method of recognizing information included in an image, the method comprising:

detecting an ambient illuminance;
based on the detected ambient illuminance being less than a reference illuminance:
  capturing, by a first image capturer, a plurality of first image frames per unit time based on the detected ambient illuminance when a moving object enters a predetermined area monitored,
  determining a speed of the moving object based on the plurality of first image frames captured per unit time,
  outputting, by the first image capturer, a trigger signal based on the speed of the moving object,
  upon receiving the trigger signal from the first image capturer, capturing, by a second image capturer, a plurality of second image frames of the moving object according to at least one of a shutter opening time of the second image capturer and an illuminance of an illuminator to illuminate the moving object which are set based on the detected ambient illuminance and the determined speed of the moving object, and
  extracting information of the moving object from the plurality of second image frames; and
based on the detected ambient illuminance being greater than or equal to the reference illuminance:
  turning off the second image capturer,
  capturing, by the first image capturer, a plurality of third image frames of the moving object, and
  extracting the information of the moving object from the plurality of third image frames captured by the first image capturer without performing the capturing the plurality of first image frames per unit time, the determining the speed of the moving object, and the outputting the trigger signal,
wherein the first image capturer is a visible light camera that captures visible light images, and the second image capturer is an infrared (IR) camera that captures IR images,
wherein the shutter opening time is set to be inversely proportional to the determined speed of the moving object, and
wherein the illuminance of the illuminator is set to be inversely proportional to the shutter opening time.

2. The method of claim 1, wherein the capturing the plurality of second image frames is performed according to both the shutter opening time of the second image capturer and the illuminance of the illuminator.

3. The method of claim 1, wherein the determining the speed of the moving object is performed by counting a number of image frames which include the moving object from among the plurality of first image frames captured per unit time by the first image capturer.

4. The method of claim 1, wherein the illuminator comprises a plurality of light-emitting components, and
wherein the method further comprises:
  determining a position of the moving object; and
  capturing the plurality of second image frames of the moving object by turning on only light-emitting components, corresponding to the determined position of the moving object, from among the plurality of light-emitting components.

5. An apparatus for recognizing information included in an image, the apparatus comprising:
a first image capturer configured to:
  based on an ambient illuminance being less than a reference illuminance, capture a plurality of first image frames per unit time based on the ambient illuminance when a moving object enters a predetermined area monitored by the first image capturer, determine a speed of the moving object based on the plurality of first image frames captured per unit time, and output a trigger signal based on the speed of the moving object, and
  based on the ambient illuminance being greater than or equal to the reference illuminance, capture a plurality of third image frames of the moving object;
a second image capturer configured to:
  based on the ambient illuminance being less than the reference illuminance and upon receiving the trigger signal from the first image capturer, capture a plurality of second image frames of the moving object according to at least one of a shutter opening time of the second image capturer and an illuminance of an illuminator to illuminate the moving object which are set based on the ambient illuminance and the speed of the moving object,
  based on the ambient illuminance being greater than or equal to the reference illuminance, turn off; and
a controller configured to:
  based on the ambient illuminance being less than the reference illuminance, extract information of the moving object from the plurality of second image frames, and
  based on the ambient illuminance being greater than or equal to the reference illuminance, extracting the information of the moving object from the plurality of third image frames captured by the first image capturer without performing the capturing the plurality of first image frames per unit time, the determining the speed of the moving object, and the outputting the trigger signal,
wherein the first image capturer is a visible light camera that captures visible light images, and the second image capturer is an infrared (IR) camera that captures IR images,
wherein the shutter opening time is set to be inversely proportional to the speed of the moving object, and
wherein the illuminance of the illuminator is set to be inversely proportional to the shutter opening time.

6. The apparatus of claim 5, wherein the second image capturer is configured to capture the plurality of second image frames of the moving object according to both the shutter opening time of the second image capturer and the illuminance of the illuminator.

7. The apparatus of claim 5, wherein the speed of the moving object is determined by the first image capturer or the controller by counting a number of image frames which include the moving object from among the plurality of first image frames captured per unit time by the first image capturer.

8. The apparatus of claim 5, further comprising the illuminator which comprises a plurality of light-emitting components, and
wherein the first image capturer is further configured to determine a position of the moving object, and
wherein the second image capturer is further configured to capture the plurality of second image frames of the moving object according to the controller turning on only light-emitting components, corresponding to the determined position of the moving object, from among the plurality of light-emitting components.

* * * * *